United States Patent
Liao

(10) Patent No.: US 10,168,552 B2
(45) Date of Patent: Jan. 1, 2019

(54) LIGHT REFLECTING LENS

(71) Applicant: Vactech Enterprise Co., LTD., Tainan (TW)

(72) Inventor: Chin-Ying Liao, Tainan (TW)

(73) Assignee: VACTECH ENTERPRISE CO., LTD., Tainan (TW)

( * ) Notice: Subject to any disclaimer, the term of this patent is extended or adjusted under 35 U.S.C. 154(b) by 0 days.

(21) Appl. No.: 15/459,171

(22) Filed: Mar. 15, 2017

(65) Prior Publication Data

US 2017/0269380 A1 Sep. 21, 2017

(30) Foreign Application Priority Data

Mar. 16, 2016 (TW) .............................. 105108012 A

(51) Int. Cl.
| | |
|---|---|
| *G02C 3/00* | (2006.01) |
| *G02C 7/12* | (2006.01) |
| *G02C 7/10* | (2006.01) |
| *G02B 1/14* | (2015.01) |
| *G02B 1/113* | (2015.01) |
| *G02B 5/02* | (2006.01) |
| *G02C 7/02* | (2006.01) |

(52) U.S. Cl.
CPC ................ *G02C 7/10* (2013.01); *G02B 1/113* (2013.01); *G02B 1/14* (2015.01); *G02B 5/0242* (2013.01); *G02B 5/0268* (2013.01); *G02B 5/0284* (2013.01); *G02C 7/021* (2013.01); *G02C 7/022* (2013.01); *G02C 7/12* (2013.01); *G02C 2202/16* (2013.01)

(58) Field of Classification Search
CPC .......... G02B 1/04; G02B 1/041; G02B 1/043; G02B 1/14; G02B 1/113; G02B 5/0242; G02B 5/0268; G02B 5/0284; G02B 5/208; G02B 5/223; G02B 1/10; G02B 1/11; G02B 1/105; G02B 1/111; G02B 1/118; G02B 5/0221; G02B 5/0226; G02B 5/0278; G02B 5/0294; G02B 5/23; G02B 5/206; G02B 5/3033; G02C 7/021; G02C 7/022; G02C 7/12; A61F 9/022; A61F 9/025; A61F 9/028
USPC ........ 351/44, 49, 83, 159.1, 159.49, 159.56, 351/159.57, 159.61, 159.62, 159.6, 351/159.65; 359/599, 722, 443, 488.01, 359/580, 582, 601; 428/141, 143, 147, 428/156, 220, 474.4, 910
See application file for complete search history.

(56) References Cited

U.S. PATENT DOCUMENTS

| | | | |
|---|---|---|---|
| 9,683,102 B2 * | 6/2017 | Cefalo | .................. C09B 47/00 |
| 2009/0086154 A1 * | 4/2009 | Dillon | .................. G02C 7/021 |
| | | | 351/44 |

* cited by examiner

*Primary Examiner* — Mustak Choudhury
(74) *Attorney, Agent, or Firm* — WPAT, PC

(57) ABSTRACT

A light reflecting lens includes a lens body, a light diffusion layer, and a light-transmitting cover layer. The lens body has a front surface and a back surface opposite to each other. The light diffusion layer includes spread aggregates formed by spraying a dispersion of light-transmitting resinous microbeads and is formed on one of the front and back surfaces of the lens body. The light-transmitting cover layer is formed on the light diffusion layer. The spread aggregates have a mean aggregate size such that the light reflecting lens has a haze not larger than 3% and a transmittance not less than 3%.

13 Claims, 14 Drawing Sheets

LIGHT REFLECTING LENS

CROSS-REFERENCE TO RELATED APPLICATION

This application claims priority of Taiwanese Patent Application No. 105108012, filed on Mar. 16, 2016.

FIELD

The disclosure relates to a lens, and more particularly to a light reflecting lens.

BACKGROUND

Generally, weight and thickness of a lens for an eyewear are primary factors affecting comfortability for a wearer. Therefore, reduction in weight and thickness of the lens is essential requirement of the wearer for obtaining decreased optical aberration, enhanced wearing comfortability, and the like.

In addition, sunglasses are a form of protective eyewear designed primarily to prevent bright sunlight and high-energy visible light from reaching the eyes. The lens for the sunglasses is usually formed with a metal deposition film or a multilayer film to reflect the bright sunlight and/or the high-energy visible light impinging thereon so as to reduce the intensity and the harmful wavelength of the light into the eyes of the wearer. However, such a lens for the sunglasses may produce a significant glare effect. Therefore, it has been developed in the art to provide the lens for the sunglasses with a different visual appearance.

Referring to FIG. 1, U.S. Pat. No. 7,443,608 discloses a diffuse reflecting lens which includes a first anti-reflective layer 29, a first light transmitting lens element 16, a reflective medium 27, a light transmitting adhesive layer 28, a second light transmitting lens element 19, and a second anti-reflective layer 30, which is proximate to eyes 46 of a wearer, in sequence. The first light transmitting lens element 16 is formed with a diffuse reflecting form texture composed of peaks and valleys on a surface thereof proximate to the second light transmitting lens element 19 so as to permit the light impinging the first light transmitting lens element 16 to diffuse reflection and thus to produce a light reduction effect for the eyes of the wearer.

In addition, U.S. Pat. No. 9,244,201 discloses a transparent multi-layer optical construction that reflects light in a diffuse manner. The transparent multi-layer optical construction is, in part, a combination of surface form and surface texture combined with a reflective medium and a scratch resistant hard coating.

SUMMARY

An object of the disclosure is to provide a light reflecting lens which includes a light diffusion layer having a specific configuration.

According to the disclosure, there is provided a light reflecting lens which includes a lens body, a light diffusion layer, and a light-transmitting cover layer. The lens body has a front surface and a back surface opposite to each other. The light diffusion layer includes spread aggregates formed by spraying a dispersion of light-transmitting resinous microbeads and is formed on one of the front and back surfaces of the lens body. The light transmitting cover layer is formed on the light diffusion layer. The spread aggregates have a mean aggregate size such that the light reflecting lens has a haze not larger than 3% and a transmittance not less than 3%.

BRIEF DESCRIPTION OF THE DRAWINGS

Other features and advantages of the disclosure will become apparent in the following detailed description of the embodiment(s) with reference to the accompanying drawings, of which.

DETAILED DESCRIPTION

Figure 1:
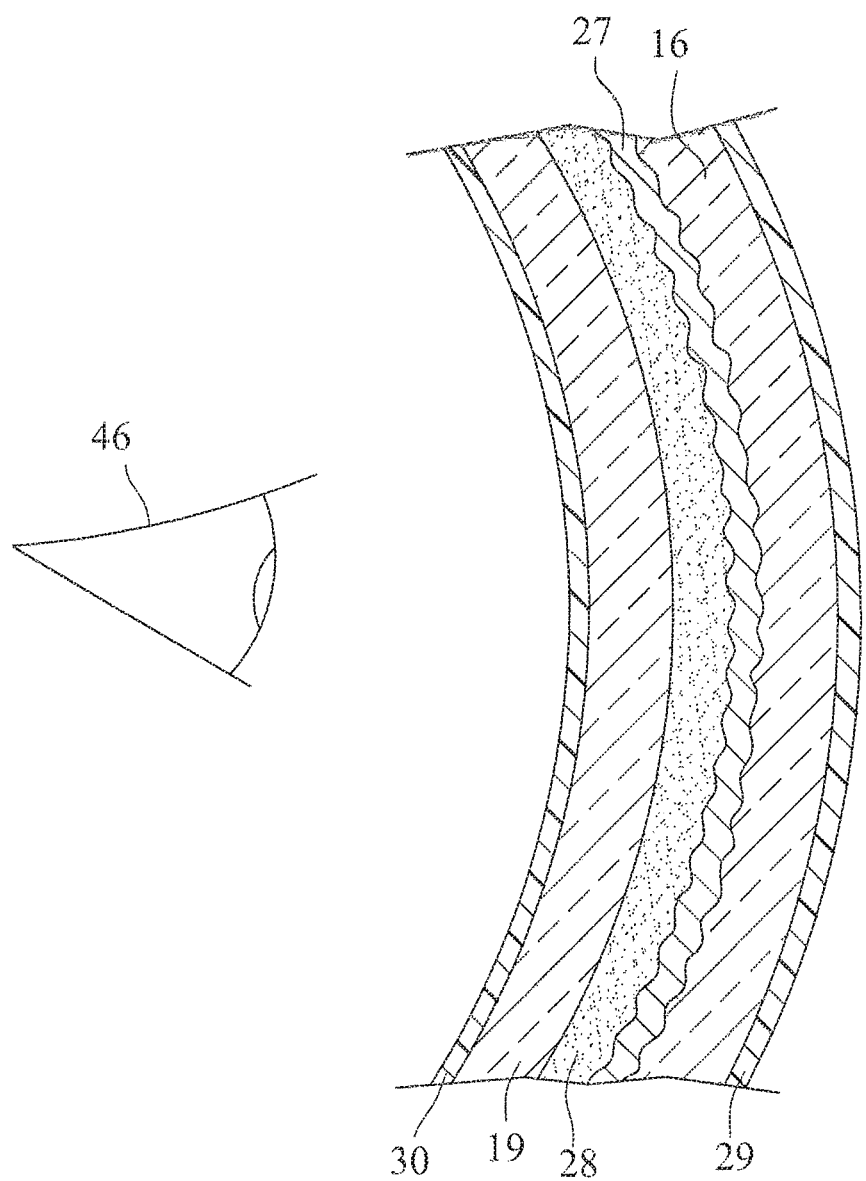
FIG. 1 is a schematic fragmentary sectional view of a diffuse reflecting lens disclosed in U.S. Pat. No. 7,443,608.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
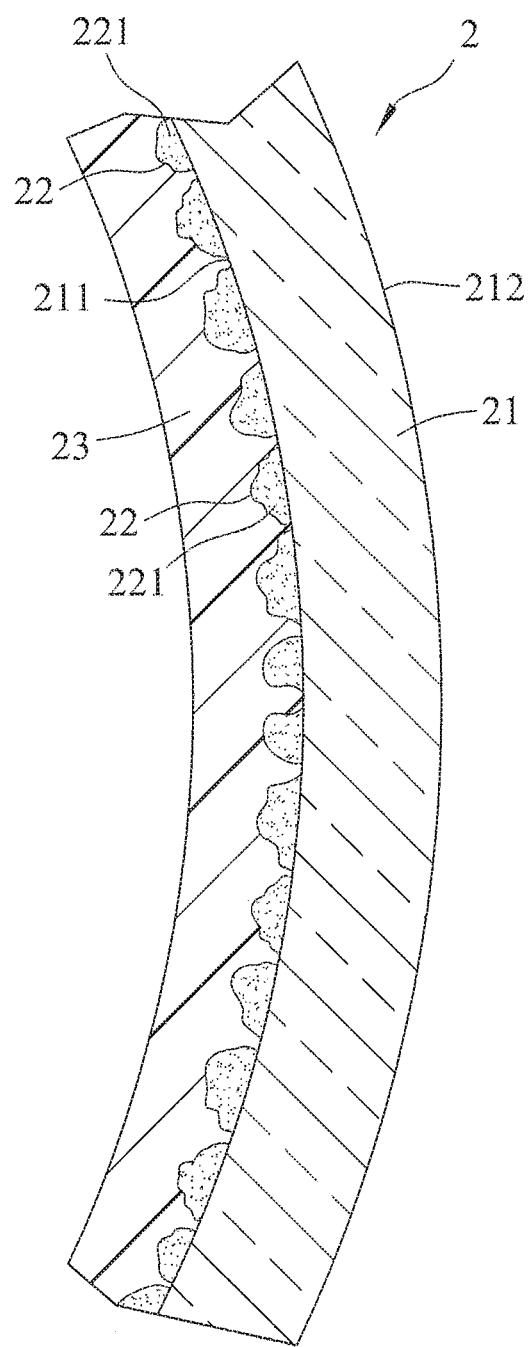
FIG. 2 is a schematic fragmentary sectional view of a first embodiment of a light reflecting lens according to the disclosure.

Referring to FIG. 2, a first embodiment of a light reflecting lens 2 according to the disclosure includes a lens body 21, a light diffusion layer 22, and a light-transmitting cover layer 23.

The lens body 21 has a predetermined curvature and has a front surface 212 and a back surface 211 which are smooth and which are opposite to each other. The lens body 21 may be made from a light-transmitting material, such as glass, resin, or the like. In addition, lens body 21 may be added with a ultra-violet absorbent to protect against a ultra-violet light. Furthermore, the lens body 21 may be made from a dyed light-transmitting material or dyed after it is made so as to provide the lens body 21 with a desirable color.

The light diffusion layer 22 includes spread aggregates 221 formed by spraying a dispersion of light-transmitting resinous micro-beads, and is formed on the back surface 211 of the lens body 21. In certain embodiments, the light-transmitting resinous micro-beads are made from silane polymer. The light diffusion layer 22 may be formed in a technique well known in the art, for example, in a "controlled stacking" technique disclosed in U.S. Pat. No. 6,620,454, the disclosure of which is incorporated herein by reference. In the "controlled stacking" technique, a dispersion for forming the light diffusion layer 22 of the light reflecting lens 2 according to the disclosure may be prepared by dispersing the light-transmitting resinous micro-beads in an organic solvent, such as isopropyl alcohol (IPA), butyl cellosolve (BCS), acetone, ethanol, and combinations thereof.

The light diffusion layer 22 is formed with a rough surface by the spread aggregates 221 so as to diffuse the light impinging thereon to obtain a light reduction effect. It should be noted that light diffusion may cause reduction in both image distinctness and light transmittance of the light reflecting lens 2. Since the light reflecting lens 2 of the disclosure is primarily used as a lens for a sunglasses, the light transmittance thereof should meet the requirements of US safety standard ANSI (American National Standards Institute) Z80.3-2009. Therefore, the sizes of the spread aggregates 221 should be controlled within a specific range so as to obtain an optimum balance between the light transmittance and the light reduction. Specifically, the spread aggregates 221 for forming the light diffusion layer 22 have a mean aggregate size not larger than 100 µm such that the light reflecting lens 2 has a haze not larger than 3% and a transmittance not less than 3%. In certain embodiments, the mean aggregate size of the spread aggregates 221 ranges from 10 µm to 80 µm. In certain embodiments, the mean aggregate size of the spread aggregates 221 ranges from 30 µm to 50 µm. In addition, the light diffusion layer 22 has a surface roughness ranging from 40 nm to 500 nm. In certain embodiments, the surface roughness of the light diffusion layer 22 ranges from 100 nm to 200 nm.

It should be noted that when the lens body 21 is made from glass, a peak-and-valley configuration (not shown in FIG. 2) may be formed on the front surface 212 of the lens body 21 by etching so as to enhance the light reduction effect.

The light-transmitting cover layer 23 is formed on the light diffusion layer 22. The light-transmitting cover layer 23 is made from a material selected from the group consisting of a thermoplastic polymer, a thermosetting polymer, a radiation-curable polymer, and combinations thereof. Examples of the material for the light-transmitting cover layer 23 include, but are not limited to, epoxy, polycarbonate, and polymethyl methacrylate. Specifically, the light-transmitting cover layer 23 is formed by coating the material for forming therefor on the light diffusion layer 22, followed by cooling to cure the material.

It should be noted that although the light reflecting lens 2 illustrated in FIG. 2 only includes a single one of the light-transmitting cover layer 23, more than one of the light-transmitting cover layer 23 may be included in the light reflecting lens 2 according to specific requirements to flexibly adjust the thickness of the light reflecting lens 2. When the light reflecting lens 2 includes a single one of the light-transmitting cover layer 23, the thickness thereof is as small as 0.5 mm. In certain embodiments, the light diffusion layer 22 and the light-transmitting cover layer 23 are of dimensions such that the light reflecting lens 2 has a thickness ranging from 0.3 mm to 4 mm.

As described above, the light reflecting lens 2 of the disclosure is primarily used as a lens for a sunglasses and the light transmittance thereof should meet the requirements of US safety standard ANSI (American National Standards Institute) Z80.3-2009. Therefore, the light reflecting lens 2 of the disclosure has a haze not larger than 3% and a transmittance not less than 3%. In certain embodiments, the haze of the light reflecting lens 2 ranges from 0.5% to 3%, and the transmittance of the light reflecting lens 2 ranges from 3% to 80%. In certain embodiments, the transmittance of the light reflecting lens 2 range from 8% to 43%.

Figure 3:
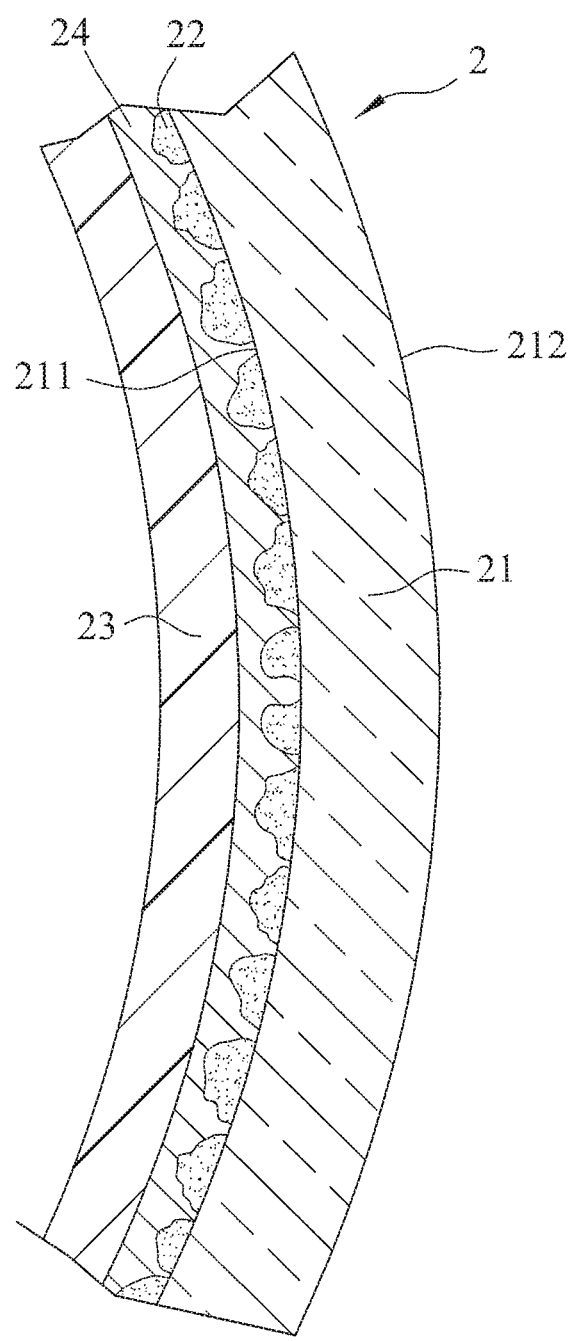
FIG. 3 is a schematic fragmentary sectional view of a second embodiment of a light reflecting lens according to the disclosure.

Referring to FIG. 3, a second embodiment of a light reflecting lens 2 according to the disclosure is similar to the first embodiment except that the second embodiment of the light reflecting lens 2 further includes a light reflective layer 24 disposed between the light diffusion layer 22 and the light-transmitting cover layer 23. The light reflective layer 24 may be formed via vacuum coating, chemical deposition, chemical vapor deposition, or other techniques well known in the art.

Since brightness of the light reflecting lens 2 may be reduced due to the light diffusion. The light reflective layer 24 included in the light reflecting lens 2 may enhance the brightness and the glossiness of the light reflecting lens 2.

The light reflective layer 22 may be made from a material selected from the group consisting of metal oxide (for example, indium tin oxide (ITO)), metal sulfide, metal nitride, chromium, aluminum, nickel, an alloy of-nickel and chromium, a dielectric material, and combinations thereof. When the light reflective layer 22 is made from the dielectric material, it may be constituted in a form of a single layer or a multi-layer stack. In order to avoid undesirable reduction of light transmittance, the thickness of the light reflective layer 24 is usually not larger than 10 µm.

Figure 4:
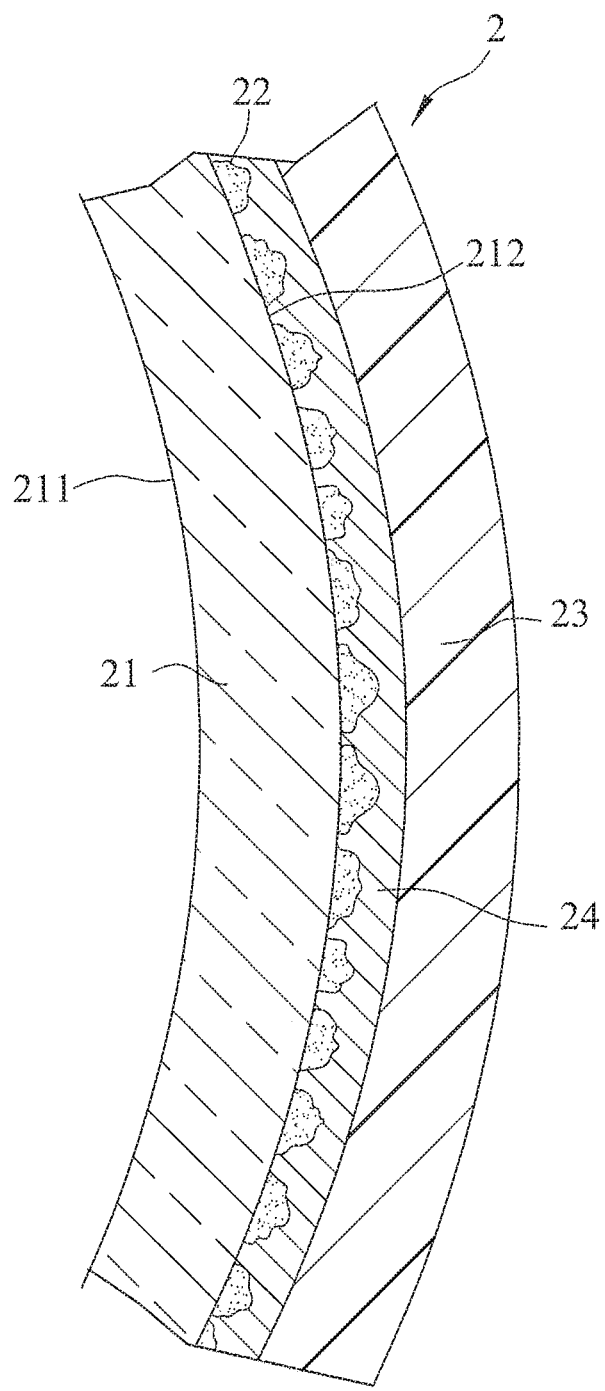
FIG. 4 is a schematic fragmentary sectional view of a variation of the second embodiment of a light reflecting lens according to the disclosure.

Referring to FIG. 4, a variation of the second embodiment of the light reflecting lens 2 according to the disclosure is illustrated, in which the light diffusion layer 22 is formed on the front surface 212 of the lens body 21. Therefore, the variation of the second embodiment of the light reflecting lens 2 includes the lens body 21, the light diffusion layer 22 formed on the lens body 21, the light reflective layer 24 formed on the light diffusion layer 22, and the light-transmitting cover layer 23 formed on the light reflective layer 24 in sequence.

Figure 5:
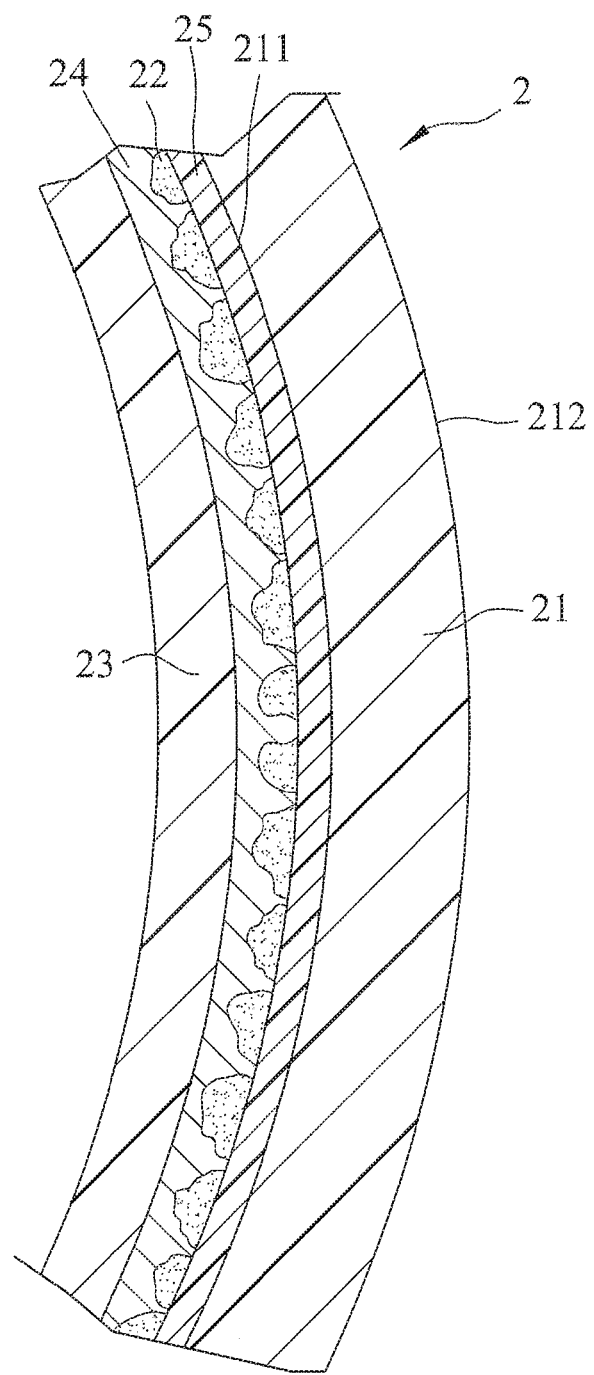
FIG. 5 is a schematic fragmentary sectional view of a third embodiment of a light reflecting lens according to the disclosure.

Referring to FIG. 5, a third embodiment of a light reflecting lens 2 according to the disclosure is similar to the second embodiment except that the third embodiment of the light reflecting lens 2 further includes a polarizing layer 25 disposed between the lens body 21 and the light diffusion layer 22 so as to provide the light reflecting lens 2 with an anti-glare effect. The polarizing layer 25 may be formed via adhesion of a polarizing film to the lens body 21.

Figure 6:
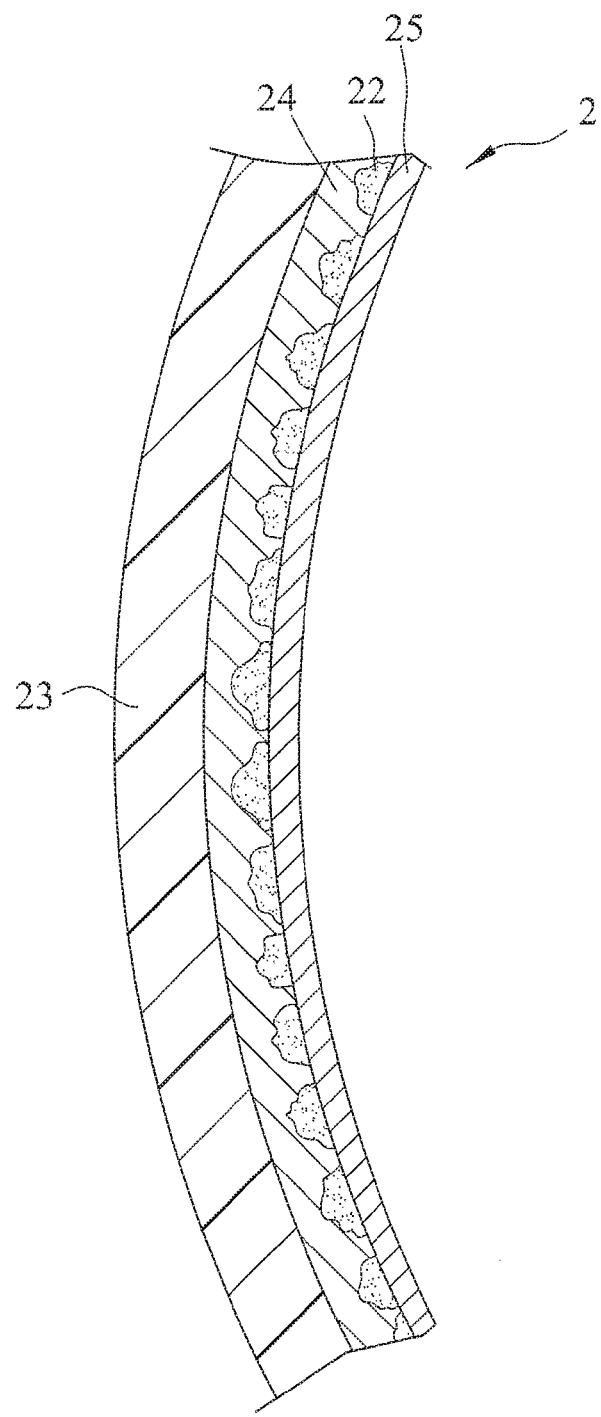
FIG. 6 is a schematic fragmentary sectional view of a variation of the third embodiment of a light reflecting lens according to the disclosure.

Referring to FIG. 6, a variation of the third embodiment of the light reflecting lens 2 according to the disclosure is illustrated, in which the lens body 21 is not included and the polarizing layer 25 is disposed directly on the light diffusion layer 22. The thickness of the light reflecting lens 2 may be significantly reduced accordingly.

Figure 7:
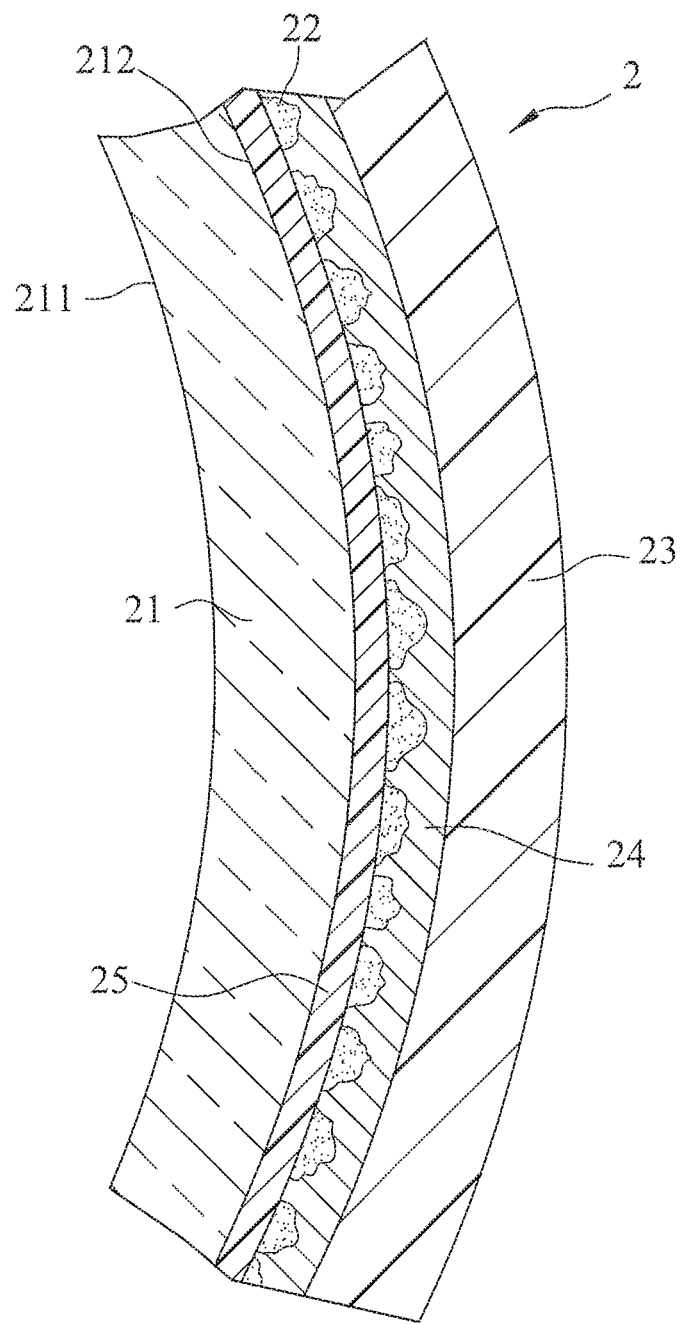
FIG. 7 is a schematic fragmentary sectional view of another variation of the third embodiment of a light reflecting lens according to the disclosure.

Referring to FIG. 7, another variation of the third embodiment of the light reflecting lens 2 according to the disclosure is illustrated, in which the polarizing layer 25 is disposed on the front surface 212 of the lens body 21. Therefore, the another variation of the third embodiment of the light reflecting lens 2 includes the lens body 21, the polarizing layer 25, the light diffusion layer 22, the light reflective layer 24, and the light-transmitting cover layer 23 in sequence.

Figure 8:
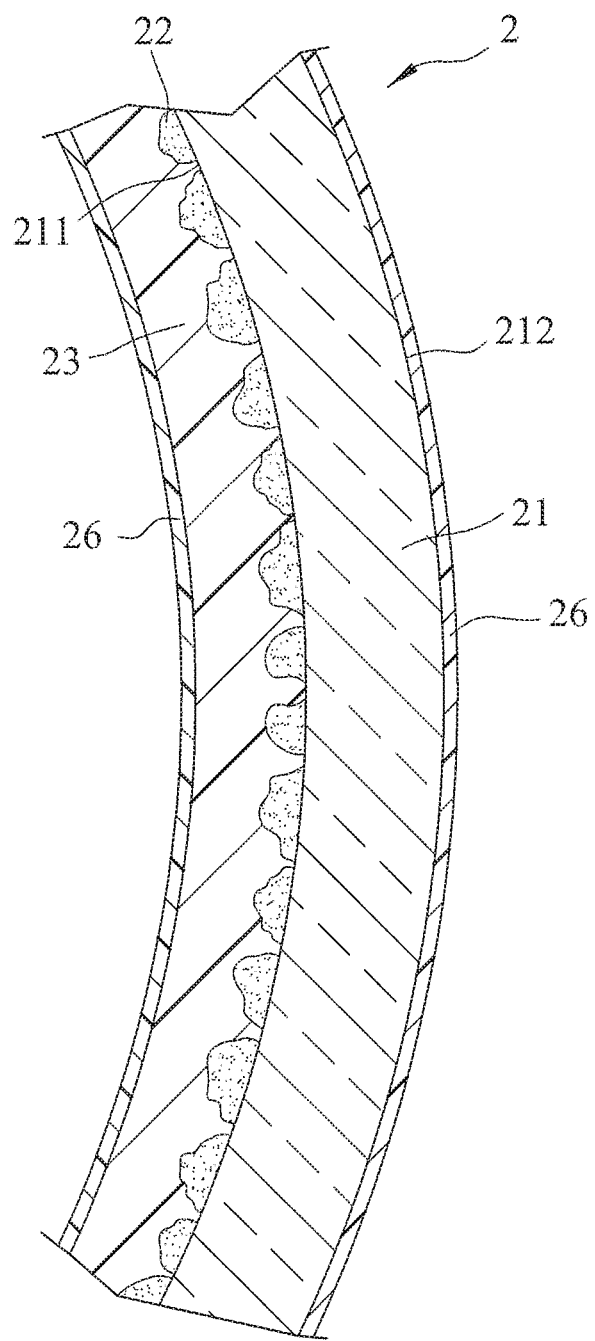
FIG. 8 is a schematic fragmentary sectional view of a fourth embodiment of a light reflecting lens according to the disclosure.

Referring to FIG. 8, a fourth embodiment of a light reflecting lens 2 according to the disclosure is similar to the first embodiment except that the fourth embodiment of the light reflecting lens 2 further includes two anti-reflective layers 26. One of the anti-reflective layers 26 is formed on the front surface 212 of the lens body 21. The other of the anti-reflective layers 26 is formed on the light-transmitting cover layer 23 and is distal from said light diffusion layer 22. The anti-reflective layer 26 may be formed via vacuum coating, chemical deposition, chemical vapor deposition, dip coating, or other techniques well known in the art.

The anti-reflective layer 26 may be made from a material selected from the group consisting of magnesium fluoride ($MgF_2$), silicon dioxide ($SiO_2$), titanium oxide ($TiO_x$, $x \leq 2$), niobium oxide ($Nb_2O_5$), tantalum oxide ($Ta_2O_3$), aluminum oxide ($Al_2O_3$), and combinations thereof. The anti-reflective layers 26 are provided for reducing the light reflection so as to enhance the light transmittance of the light reflecting lens 2 and to reduce irritation to the eyes of the wear caused by the reflected light.

Figure 9:
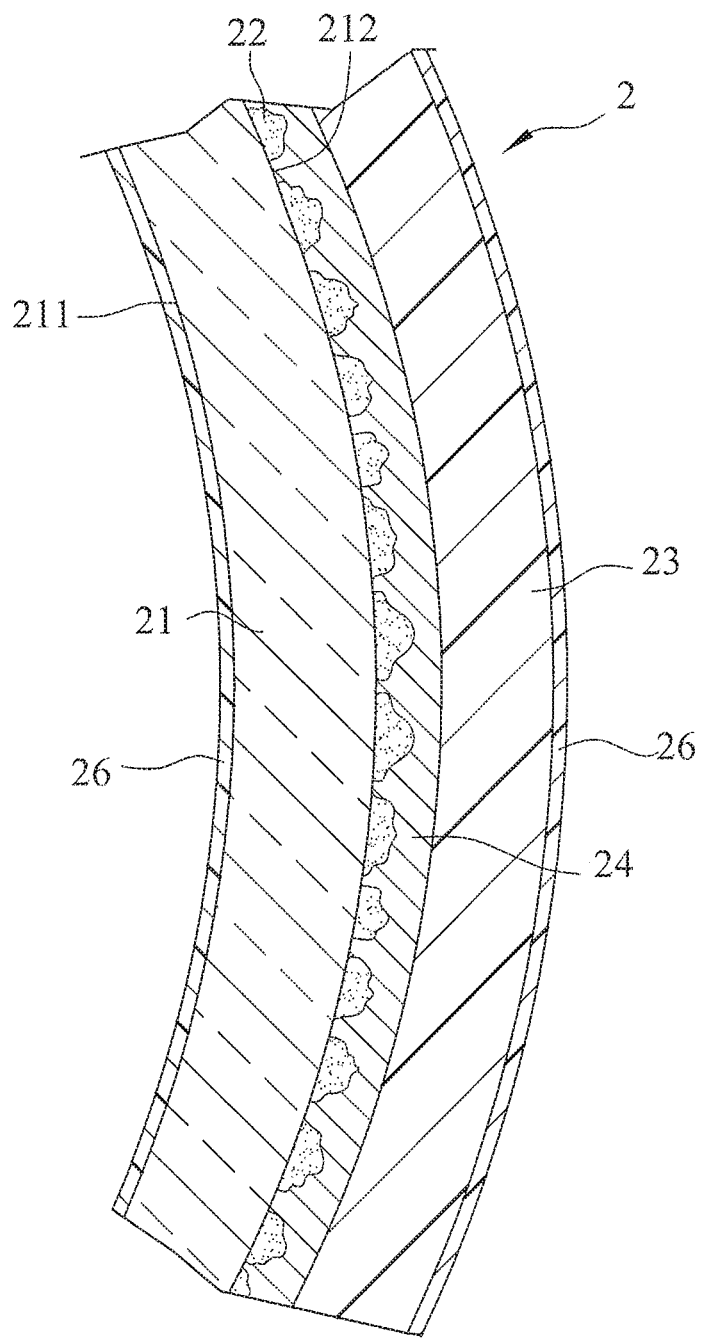
FIG. 9 is a schematic fragmentary sectional view of a fifth embodiment of a light reflecting lens according to the disclosure.

Referring to FIG. 9, a fifth embodiment of a light reflecting lens 2 according to the disclosure is similar to the variation of the second embodiment illustrated in FIG. 4 except that the fifth embodiment of the light reflecting lens 2 further includes the anti-reflective layers 26. One of the anti-reflective layers 26 is formed on the front surface 212 of the lens body 21. The other of the anti-reflective layers 26 is formed on the light-transmitting cover layer 23 and is distal from said light diffusion layer 22.

Figure 10:
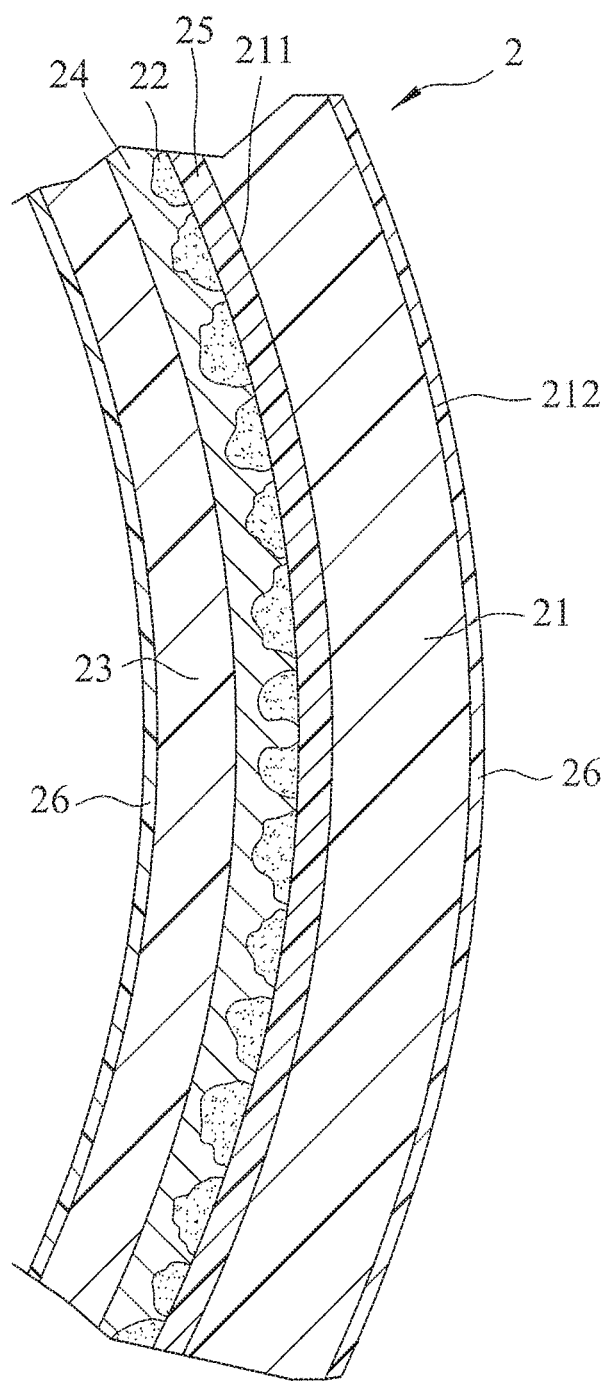
FIG. 10 is a schematic fragmentary sectional view of a sixth embodiment of a light reflecting lens according to the disclosure.

Referring to FIG. 10, a sixth embodiment of a light reflecting lens 2 according to the disclosure is similar to the third embodiment illustrated in FIG. 5 except that the sixth embodiment of the light reflecting lens 2 further includes the anti-reflective layers 26. One of the anti-reflective layers 26 is formed on the front surface 212 of the lens body 21. The other of the anti-reflective layers 26 is formed on the light-transmitting cover layer 23 and is distal from said light diffusion layer 22.

Figure 11:
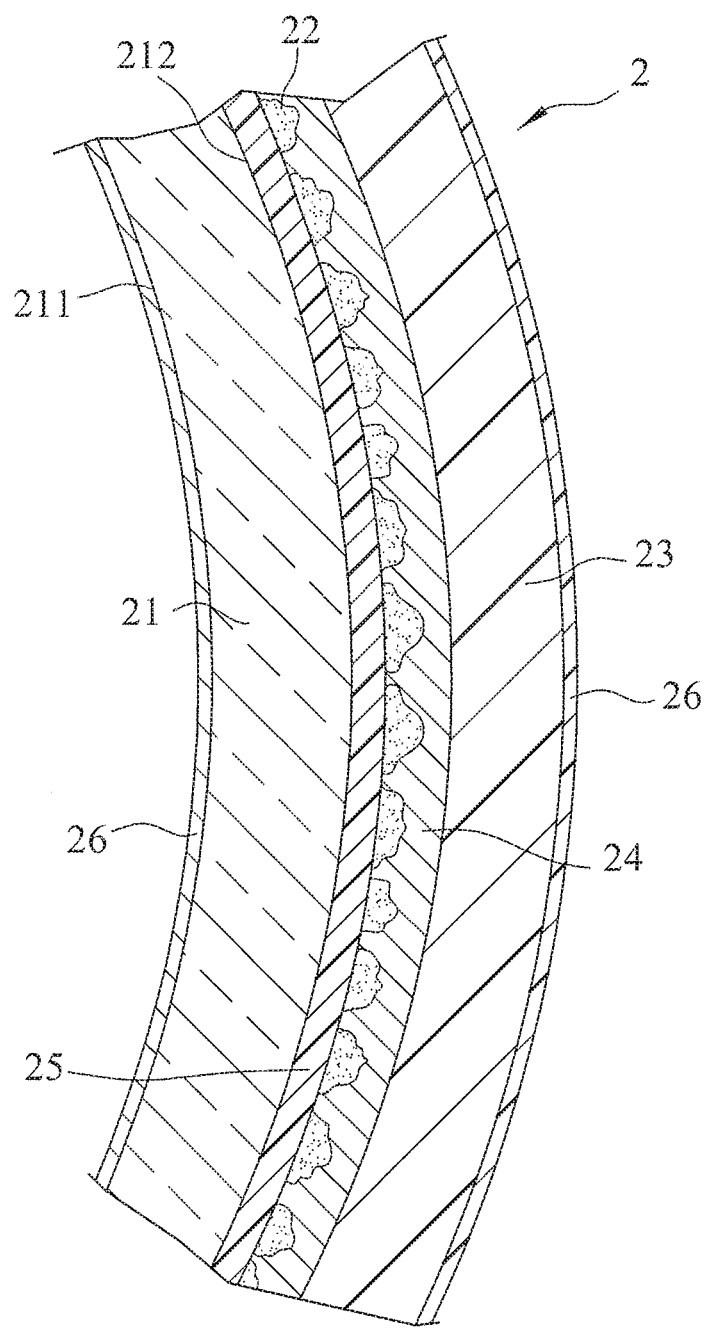
FIG. 11 is a schematic fragmentary sectional view of a seventh embodiment of a light reflecting lens according to the disclosure.

Referring to FIG. 11, a seventh embodiment of a light reflecting lens 2 according to the disclosure is similar to the another variation of the third embodiment illustrated in FIG. 7 except that the seventh embodiment of the light reflecting lens 2 further includes the anti-reflective layers 26. One of the anti-reflective layers 26 is formed on the back surface 211 of the lens body 21. The other of the anti-reflective layers 26 is formed on the light-transmitting cover layer 23 and is distal from said light diffusion layer 22.

Figure 12:
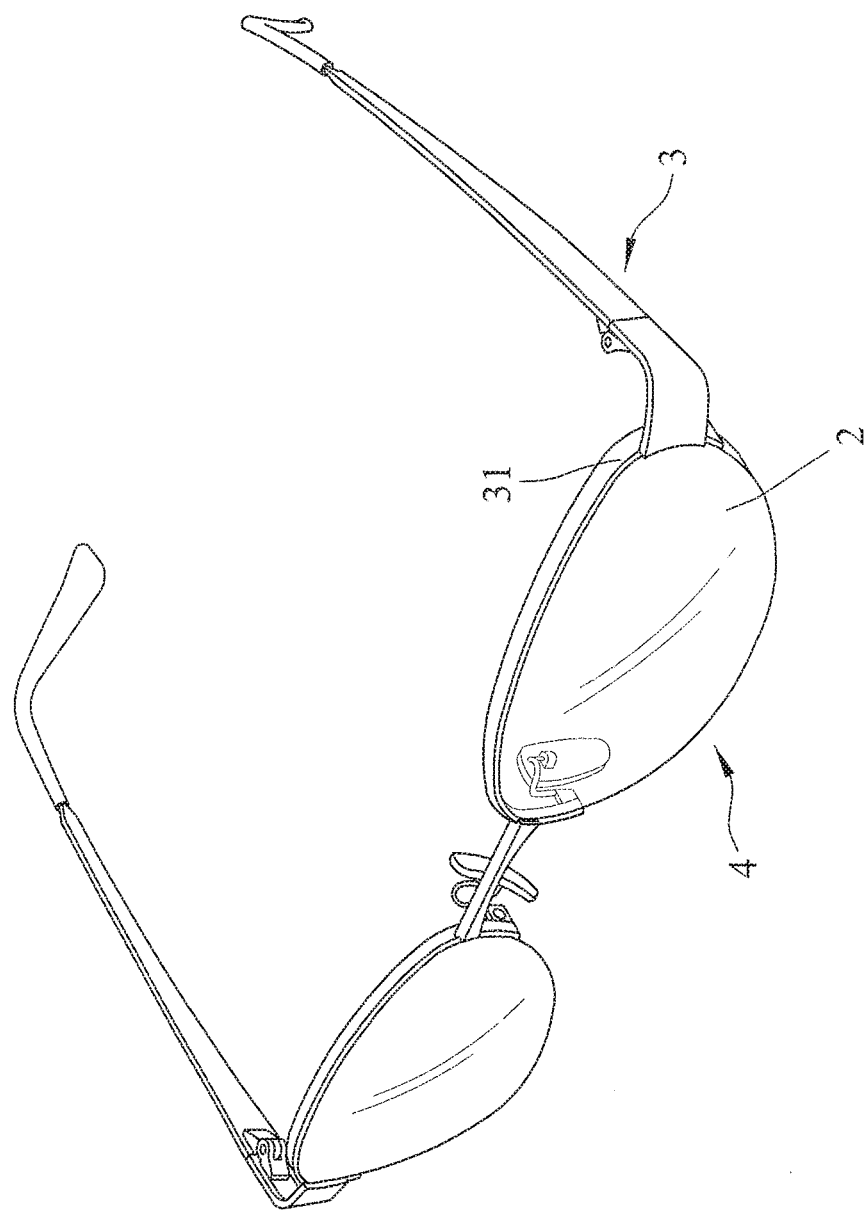
FIG. 12 is a perspective view of an eyewear including the light reflecting lens according to the disclosure.

Referring to FIG. 12, in which an eyewear is illustrated to include an eyewear frame 3 and a lens unit 4. The eyewear frame 3 includes two frame portions 31. The lens unit 4 includes a pair of the light reflecting lenses 2 of the disclosure, which are installed in the frame portions 31 of the eyewear frame 3, respectively.

In addition, the light reflecting lens 2 of the disclosure may be used for a goggle in which the lens unit 4 composed of a single one of the light reflecting lens 2 of the disclosure is installed.

The following example is provided to illustrate the embodiment of the disclosure, and should not be construed as limiting the scope of the disclosure.

EXAMPLE

An automatic spray gun (AGPV series available from DeVilbiss Ransburg industrial coating Equipment of Maumee, Ohio, USA) was used to spray a dispersion of silane polymer micro-beads to form a light diffusion layer on a lens body. The processing parameters of the automatic spray gun are as follows. A spray gun head pressure was 100 psi. A distance between the spay gun head and the lens body was 13-14 inches. A width of a spray discharge contacting a surface of the lens body was 8-12 inches. A spray discharge rate was 0.03-0.05 l/min (liters per minute).

A silicon hard coating liquid (NSC-1500 available from Nippon Fine Chemical Co., Ltd.) was then coated on the light diffusion layer to form a light-transmitting cover layer in a thickness of 1.5-3 μm to obtain a light reflecting lens. The processing parameters for forming the light-transmitting cover layer as follows. A drawing speed was 1 mm/sec. Pre-baking was performed at 90° C. for 5 minutes, followed by baking at 120° C. for 2 hours.

Figure 13:
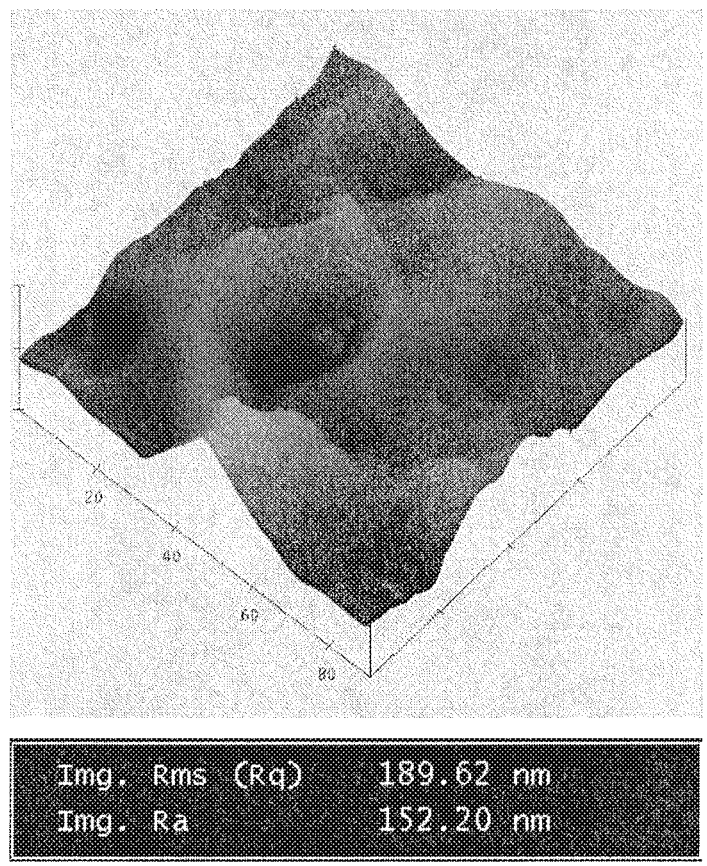
FIG. 13 is a surface topographic image taken by an atomic force microscope to show a roughness profile of a light diffusion layer of a working example of a light reflecting lens according to the disclosure.

The surface topographic image of the light diffusion layer of the light reflecting lens thus obtained is shown in FIG. 13. A surface roughness (Rms (Rq)) of the light diffusion layer is 189.62 nm.

Figure 14:
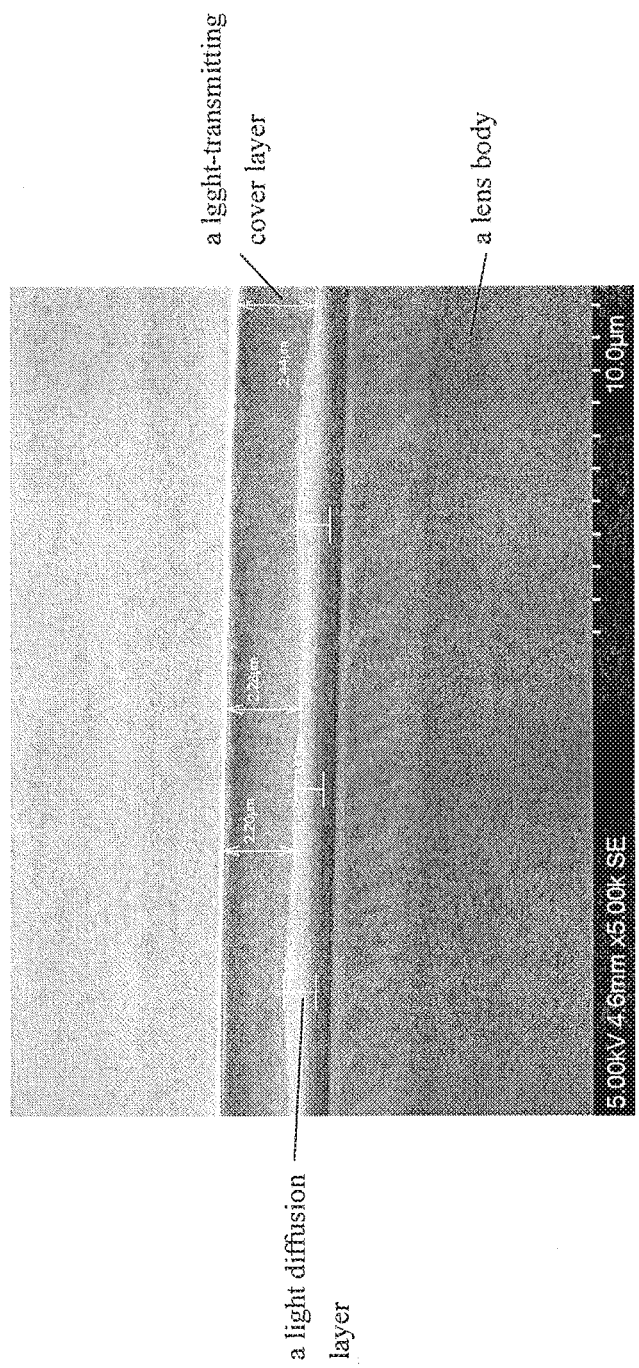
FIG. 14 is a scanning electron microscopic image showing thicknesses of a light-transmitting cover layer and a light diffusion layer of the working example of a light reflecting lens according to the disclosure.

A scanning electron microscopic image of the light reflecting lens thus obtained is illustrated in FIG. 14 to show the thickness of the light-transmitting cover layer and the light diffusion layer.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A light reflecting lens, comprising:
    a lens body having a front surface and a back surface opposite to each other;
    a light diffusion layer which includes spread aggregates formed by spraying a dispersion of light-transmitting resinous micro-beads and which is formed on one of said front and back surfaces of said lens body, wherein the light-transmitting resinous micro-beads are made from silane polymer; and
    a light-transmitting cover layer formed on said light diffusion layer,
    wherein said spread aggregates have a mean aggregate size ranging from 10 μm to 80 μm, such that the light reflecting lens has a haze not larger than 3% and a transmittance not less than 3%.

2. The light reflecting lens according to claim 1, wherein the mean aggregate size of said spread aggregates ranges from 30 μm to 50 μm.

3. The light reflecting lens according to claim 1, wherein said lens body includes a peak-and-valley configuration which is formed on the other of said front and back surfaces of said lens body.

4. The light reflecting lens according to claim 1, further comprising a light reflective layer which is disposed between said light diffusion layer and said light-transmitting cover layer.

5. The light reflecting lens according to claim 4, wherein said light reflective layer is made from a material selected from the group consisting of metal oxide, metal sulfide, metal nitride, chromium, aluminum, nickel, an alloy of nickel and chromium, a dielectric material, and combinations thereof.

6. The light reflecting lens according to claim 4, further comprising a polarizing layer which is disposed between said lens body and said light diffusion layer.

7. The light reflecting lens according to claim 4, further comprising an anti-reflective layer which is formed on at least one of said lens body and said light-transmitting cover layer and which is distal from said light diffusion layer.

8. The light reflecting lens according to claim 7, wherein said anti-reflective layer is made from a material selected from the group consisting of magnesium fluoride, silicon dioxide, titanium oxide, niobium oxide, tantalum oxide, aluminum oxide, and combinations thereof.

9. The light reflecting lens according to claim 1, wherein said light-transmitting cover layer is made from a material selected from the group consisting of a thermoplastic polymer, a thermosetting polymer, a radiation-curable polymer, and combinations thereof.

10. The light reflecting lens according to claim 1, wherein said light diffusion layer has a surface roughness ranging from 40 nm to 500 nm.

11. The light reflecting lens according to claim 10, wherein the surface roughness of said light diffusion layer ranges from 100 nm to 200 nm.

12. The light reflecting lens according to claim 1, wherein the haze of said light reflecting lens ranges from 0.5% to 3% and the transmittance of said light reflecting lens ranges from 3% to 80%.

13. The light reflecting lens according to claim 1, wherein said light diffusion layer and said light-transmitting cover layer are of dimensions such that the light reflecting lens has a thickness ranging from 0.5 mm to 4 mm.

\* \* \* \* \*